July 22, 1941.   W. ROCKE   2,250,314
DISHWASHING MACHINE
Filed Oct. 26, 1936   2 Sheets-Sheet 1
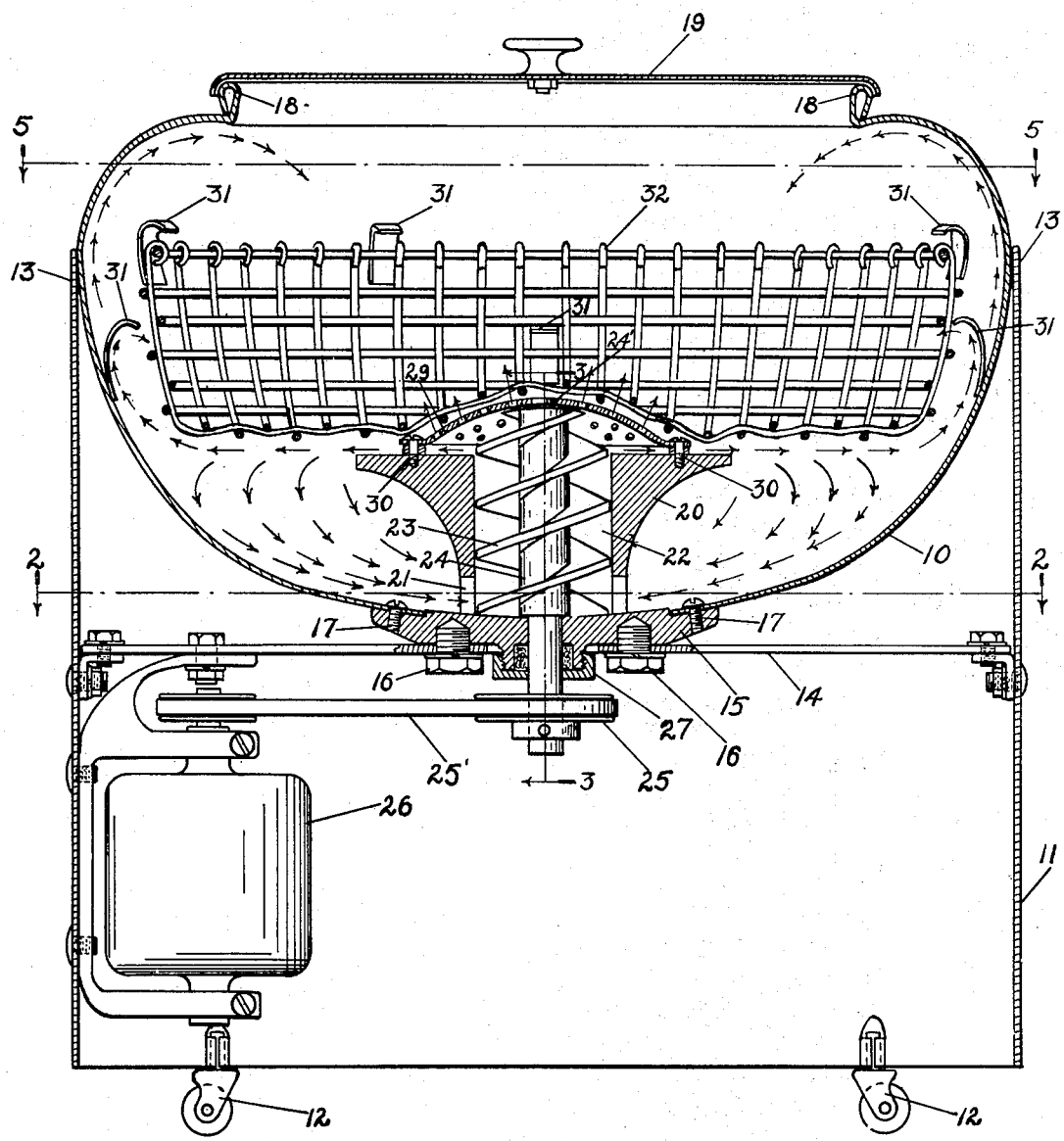
FIG_1_
INVENTOR
William Rocke
BY Tefft & Tefft
ATTORNEYS July 22, 1941.          W. ROCKE          2,250,314
DISHWASHING MACHINE
Filed Oct. 26, 1936          2 Sheets-Sheet 2
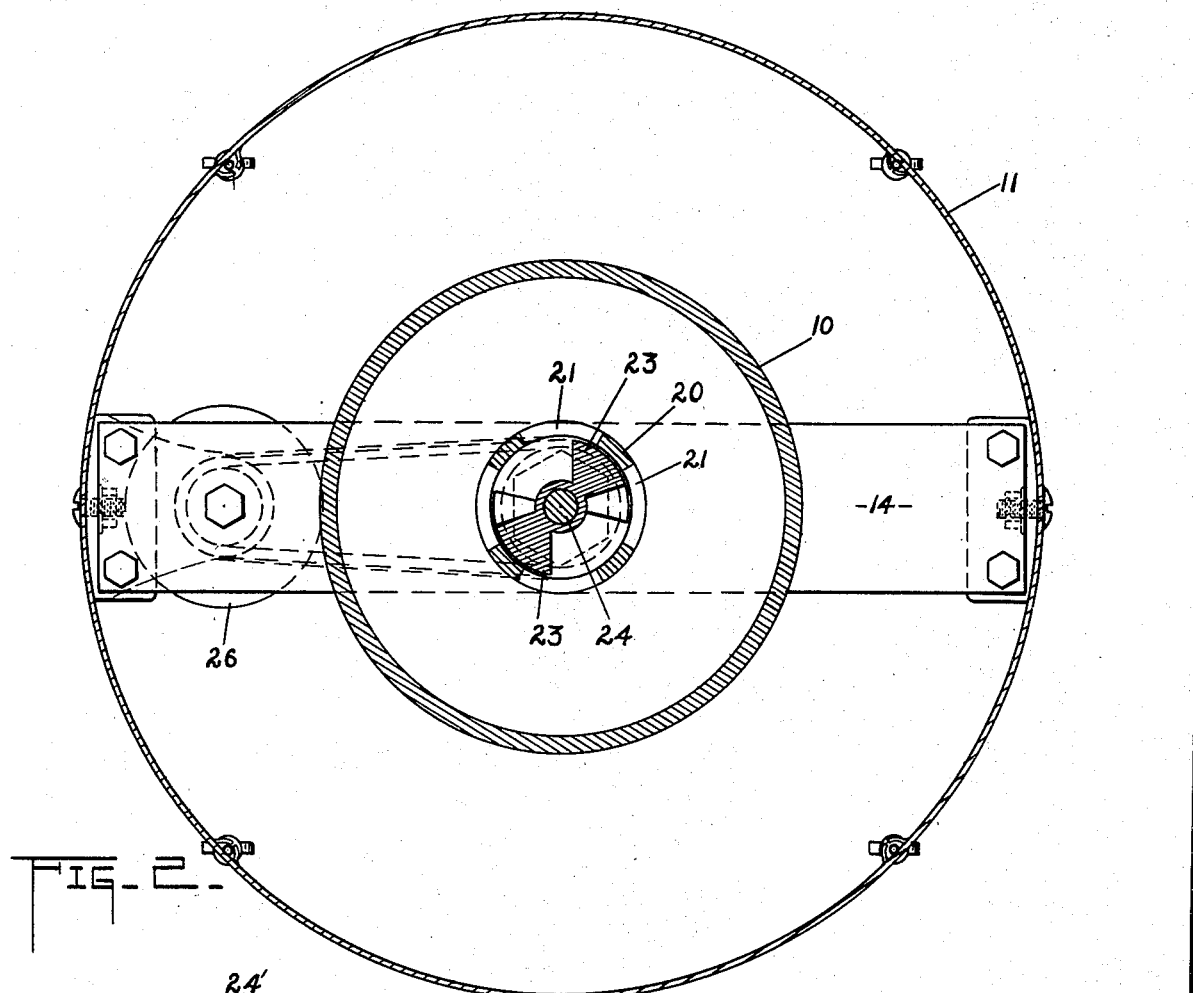
FIG_2_
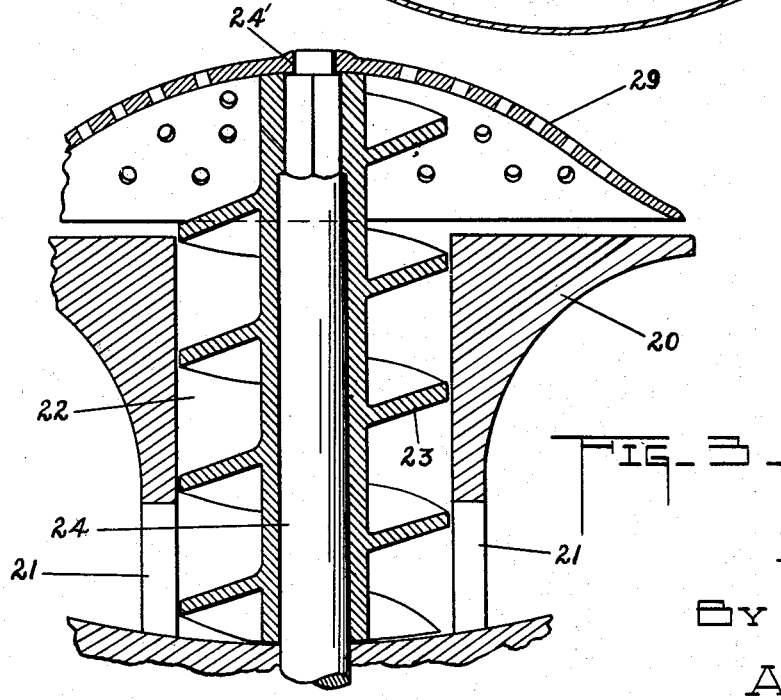
FIG_3_
INVENTOR
William Rocke
BY Tefft & Tefft
ATTORNEYS Patented July 22, 1941

2,250,314

UNITED STATES PATENT OFFICE 2,250,314

DISHWASHING MACHINE

William Rocke, South Bend, Ind.

Application October 26, 1936, Serial No. 107,598

3 Claims. (Cl. 141—9)

This invention has reference to a machine for washing dishes and the like and has for its principal object to provide a dish washer having a novel means for circulating water around dishes placed in the machine in such a manner as to efficiently wash them.

Another object is to provide a machine of the class described which includes means for circulating water in a receptacle in a turbulent manner, there being currents or streams projected onto and around the dishes in such a manner that all surfaces of each dish are subjected to the action of the circulated water.

A further object is to provide, in a dish washing machine, a novel pump means for circulating water and a novel arrangement of parts which direct the pumped water in such a manner as to circulate around and between the dishes and return to the pump to be recirculated.

Other objects will become apparent during perusal of the following description and accompanying drawings in which:

Fig. 1 is a sectional elevational view taken approximately through the center of my device;

Fig. 2 is a sectional plan view taken on line 2—2 in Fig. 1;

Fig. 3 is an enlarged fragmental sectional elevational view taken on line 3—3 in Fig. 1;

Fig. 1 shows the device as consisting of a bowl or tub 10 supported by any suitable means such as a skirt structure 11, supported upon castors 12.

The bowl 10 is affixed in the skirt structure by means of attachment or substantially tight contact at 13 and a cross member 14 to which a bottom portion 15 of the bowl structure is attached by the screws 16.

The bottom portion 15 is attached to the wall portion of the bowl by screws 17 or any other suitable means.

The walls of the bowl are preferably arcuate in form and are turned inwardly at the top, the inner top edge being finished by an upturned beaded portion 18 adapted to receive a cover 19.

To the bottom portion 15 is attached an upstanding part 20, there being openings 21 through the base portion, see Fig. 2, to permit a free flow of water into the pump cavity 22. The upper portion is flared outwardly as shown.

In the cavity 22 there is disposed a pump mechanism consisting of helically arranged flights 23 mounted on a shaft 24 which passes downwardly through portion 15 and carries a pulley 25 on its lower end. The pulley has driving connection with a motor 26 through a belt 25¹.

A conventional stuffing box assembly 27 forms a lower bearing for the shaft and prevents leakage of water from the bowl. The upper end of the shaft is journalled in a bearing 24 formed in a cover number 29. See Fig. 3.

Disposed over the propeller assembly is the cover member 29 secured to the flared portion of part 20 by means of screws 30, it being spaced a small distance from the surface of part 20 as shown.

The cover member is concaved in form and is perforated as indicated in the several views.

Secured to the inner surface of the bowl is a series of curved deflectors 31 arranged in staggered relation as shown in Fig. 1.

A removable basket 32, having its bottom part shaped to lie over cover 29 is disposed in the bowl as shown.

Operation of the device is as follows:

The propeller 23 is obviously rotated at relatively high speed by the motor 26 to pump water upwardly and out through the opening between cover 29 and the upper surface of part 20, also outwardly into the central portion of the bowl through the perforations in the cover. The perforations are so dimensioned as to permit the flow of only a relatively small quantity of water and the capacity of the pump is made such as to maintain considerable pressure under the cover whereby the water is forced outwardly as noted, and indicated by arrows, toward the sides of the bowl whereby it is deflected upwardly and inwardly toward the center of the bowl. Those portions flowing over the deflectors 31 are deflected in relatively small streams so that the general circulation of water toward the top of the bowl is modified and the general turbulence is increased. The deflectors may obviously be of any size, shape or arrangement as dictated by the requirements of practical use.

The circulatory movements just described are obviously produced by the forcibly ejected stream of water over and across the top of part 20. While the water is being pumped and circulated as described a like quantity is being returned to the propeller through the openings 21 and thus the water is continuously circulated within the bowl in a lightly agitated state, over and around dishes disposed in the basket 32. At the same time the water is ejected upwardly toward the under side of the dishes through the perforations in cover 29.

It will be apparent that the devices above described are adapted to circulate water for the purpose described, in a highly turbulent state whereby dishes may be thoroughly and quickly washed without manipulation or contact with moving parts. Modifications of the structure described are obviously possible without alteration of the principle involved. I do not wish to be limited in structure or function except within the scope of the appended claims.

What I claim is:

1. In a dish washing machine, a tub having an inturned upper rim, a pump mounted centrally in the bottom of said tub, said pump having an inlet adjacent the tub bottom and a central discharge opening, a perforate circular cap spaced over said pump discharge, said cap forming a nozzle whereby wash water is directed under the cap circumferentially outwardly up the sides of the tub where it is cascaded inward by the inturned rim and through the perforations in the cap radially upward thereby to effect washing.

2. In a dish washing machine, a tub having an inturned upper rim, a lift pump having a housing mounted centrally in the bottom of said tub, said pump housing having a bottom inlet and a top vertical discharge opening, a perforate circular cap spaced over said pump discharge, said cap forming a nozzle whereby wash water is directed under the cap circumferentially outwardly up the sides of the tub where it is cascaded inward by the inturned rim and through the perforations in the cap radially upward thereby to effect washing.

3. In a dish washing machine, a tub having an inturned upper rim, a lift pump having a housing mounted centrally in the bottom of said tub, said pump housing having a bottom inlet and a top vertical discharge opening, a perforate circular cap spaced slightly above and over said vertical discharge opening, a dish rack supported above said cap, said cap forming a nozzle whereby wash water is directed circumferentially outward under the rack and up the sides of the tub where it is cascaded inwardly by the inturned rim of the tub and through the perforations in the cap radially upward through the rack thereby to effect washing.

WILLIAM ROCKE.